US006647860B2

(12) United States Patent
Savel et al.

(10) Patent No.: US 6,647,860 B2
(45) Date of Patent: *Nov. 18, 2003

(54) THIN-WALLED BRAKE DIAPHRAGM

(75) Inventors: Robert M. Savel, Max Meadows, VA (US); Tracy Burcham, Fries, VA (US); Niranjan Haralalka, New Palestine, IN (US)

(73) Assignee: Longwood Industries, Inc., Florham Park, NJ (US)

( * ) Notice: Subject to any disclaimer, the term of this patent is extended or adjusted under 35 U.S.C. 154(b) by 331 days.

This patent is subject to a terminal disclaimer.

(21) Appl. No.: 09/764,603

(22) Filed: Jan. 18, 2001

(65) Prior Publication Data

US 2001/0001378 A1 May 24, 2001

Related U.S. Application Data

(63) Continuation of application No. 09/344,755, filed on Jun. 25, 1999.

(51) Int. Cl.[7] ................................. F01B 19/00
(52) U.S. Cl. ....................... 92/101; 92/103 F
(58) Field of Search .................. 92/103 F, 98 R, 92/61

(56) References Cited

U.S. PATENT DOCUMENTS

| | | | |
|---|---|---|---|
| 2,744,543 A | 5/1956 | Brady | 137/791 |
| 3,135,173 A | 6/1964 | Jack | 92/103 |
| 3,435,734 A | 4/1969 | Bushway | 92/101 |
| 3,872,777 A | 3/1975 | Mastis | 92/101 |
| 3,911,796 A | 10/1975 | Hull | 92/101 |
| 4,864,918 A | 9/1989 | Martin | 92/103 SD |
| 5,349,896 A | 9/1994 | Delaney | 92/98 R |
| 5,743,170 A | 4/1998 | Pascual | 92/103 F |
| 5,907,992 A | 6/1999 | Huss | 92/103 F |
| 6,212,996 B1 * | 4/2001 | Savel et al. | 92/101 |

FOREIGN PATENT DOCUMENTS

| | | |
|---|---|---|
| DE | 23 43 663 A1 | 3/1975 |
| GB | 2 012 914 A | 8/1979 |

* cited by examiner

Primary Examiner—Edward K. Look
Assistant Examiner—Michael Leslie
(74) Attorney, Agent, or Firm—Lerner, David, Littenberg Krumholz & Mentlik, LLP

(57) ABSTRACT

A fabric reinforced, resilient brake diaphragm for use in a fluid pressure operated braking system is provided. The diaphragm comprises an annular outer flange for engaging the housing of the braking system, a bottom planar wall having an interior surface for engaging the piston of the braking system, an annular sidewall connecting the outer flange and the bottom planar wall and a plurality of spaced planar tabs disposed on the interior surface of the bottom planar wall extending radially from the intersection between the annular sidewall and the bottom planar wall toward the center of the interior surface. The diaphragm has a thin-walled construction with the bottom planar wall and annular sidewall having a thickness of between approximately 0.06 inches and approximately 0.10 inches.

6 Claims, 3 Drawing Sheets

THIN-WALLED BRAKE DIAPHRAGM

CROSS REFERENCE TO RELATED APPLICATIONS

This application is a continuation of U.S. application Ser. No. 09/344,755, filed Jun. 25, 1999, the subject matter of which is incorporated herein by reference.

FIELD OF THE INVENTION

The present invention relates to diaphragms and, more particularly, to flexible diaphragms used in brake actuators operated by fluid pressure.

BACKGROUND OF THE INVENTION

Diaphragms used in brake actuators operated by fluid pressure, such as actuators in air braking systems of trucks and trains, are made from a layer of fabric, e.g., nylon, sandwiched between two layers of flexible material, generally rubber or synthetic rubber, to form an integral structure. The diaphragm generally is supported at its periphery within a housing of the actuator. Upon introduction of fluid pressure, such as compressed air, on one side of the diaphragm, the diaphragm moves a push plate or piston to actuate a braking mechanism. The diaphragm is returned to its normal position when the compressed air is released by a spring exerting an opposite force on the push plate or piston.

Diaphragms of this type generally are cup shaped with a bottom wall or base merging into a conical annular wall. The conical annular wall terminates at an annular lip or flange which is clamped between upper and lower portions of the housing.

In normal operation, a diaphragm of this type is inverted by the force of the compressed air, and returned to its normally biased position, many thousands of times. Such repeated motion places extreme stress on the diaphragm, often causing wear or rupture. In order to increase the life of diaphragms of this type, various spacing structures at the zone of merger between the diaphragm's bottom wall and annular sidewall have been proposed. See, e.g., U.S. Pat. Nos. 3,135,173; 3,435,734; 3,872,777; and 3,911,796. Although these structures may increase the life of the diaphragm, they also increase the cost, and the quantity of materials needed, for manufacture.

SUMMARY OF THE INVENTION

The present invention provides a fabric reinforced, resilient brake diaphragm for use in fluid pressure operated braking systems. The diaphragm has a durability equal to, or exceeding, that of present brake diaphragms but requires substantially less materials to manufacture and, therefore, is substantially less costly to manufacture.

A brake diaphragm in accordance with the present invention has an annular outer flange for engaging the housing of a braking system and a bottom planar wall having an interior surface for engaging a piston of the braking system. The bottom planar wall has a thickness of between approximately 0.06 inches and approximately 0.10 inches. The diaphragm also has an annular sidewall, connecting the outer flange and the bottom planar wall, and a plurality of spaced planar tabs disposed on the interior surface of the bottom planar wall. Each of these tabs extends radially, from the intersection of the annular sidewall and bottom planar wall, toward the center of the interior surface of the bottom planar wall.

The thickness of the annular sidewall preferably also is between approximately 0.06 inches and approximately 0.10 inches, and the height of each of the planar tabs above the interior surface of the bottom planar wall preferably is approximately 0.05 inches. The spaced planar tabs preferably are evenly spaced on the interior surface along the intersection of the annular sidewall and bottom planar wall. In a particularly preferred embodiment, the bottom planar wall has a thickness of approximately 0.08 inches, the annular sidewall has a thickness of approximately 0.08 inches, the height of each of the planar tabs above the interior surface of the bottom planar wall is approximately 0.05 inches, and the planar tabs are evenly spaced on the interior surface along the intersection of the annular sidewall and bottom planar wall. These tabs are rectangularly shaped, moreover, and four in number.

Notwithstanding the thinness of the walls of a brake diaphragm having a structure in accordance with the present invention, and the substantial savings in materials and costs, diaphragms having such a structure meet or exceed all of the SAE (Society of Automotive Engineers) standards for diaphragms of this type.

DESCRIPTION OF THE PREFERRED EMBODIMENTS

Figure 1:
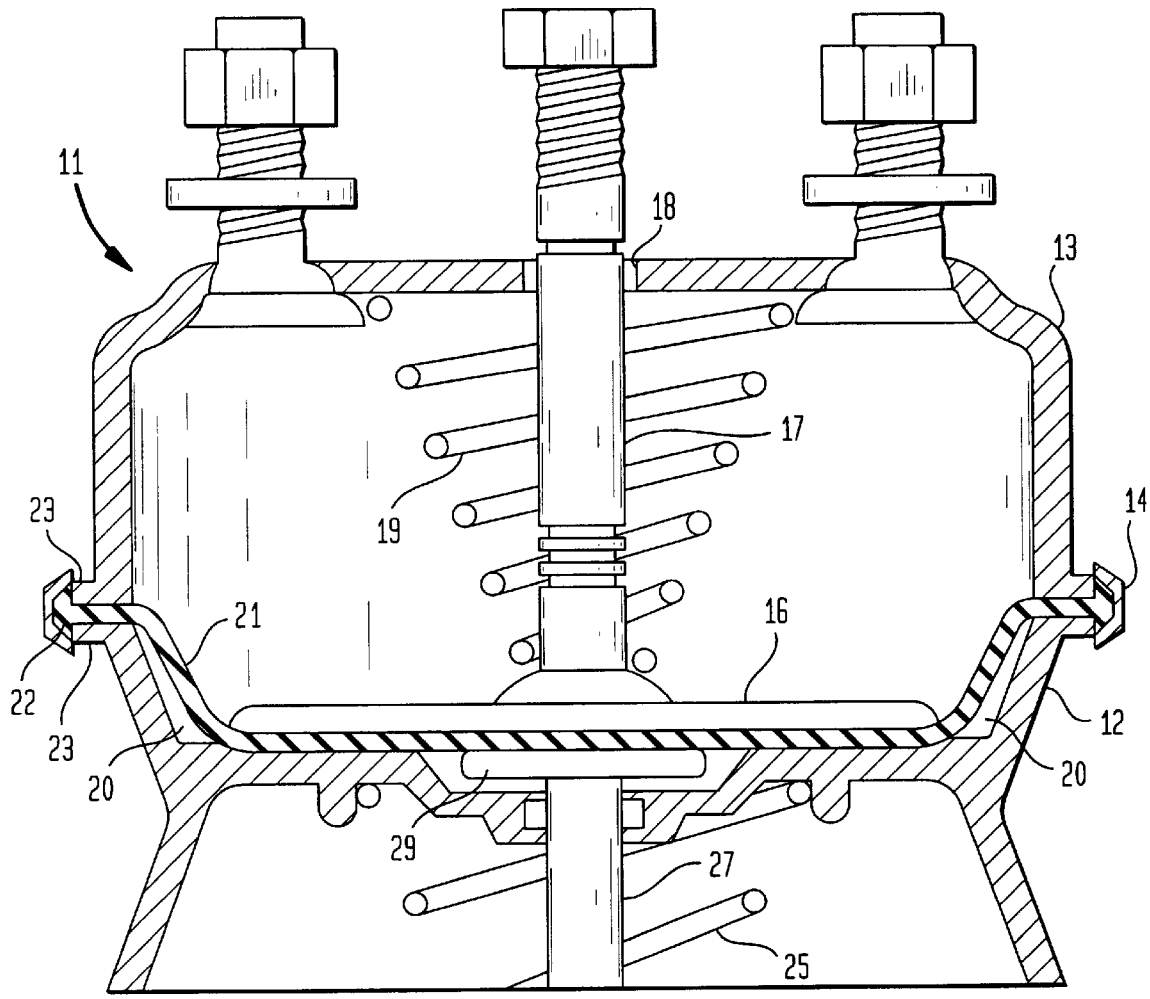
FIG. 1 is a vertical sectional view of an air brake actuator.

FIG. 1 illustrates a conventional air brake actuator 11 of the type used on trucks and trains. Actuator 11 comprises a circular chamber consisting of separate housing parts 12 and 13 held together by clamp band 14 attached to flanges 23. A moveable piston 16, attached to piston rod 17, is disposed within the chamber and extends through an opening 18 in housing part 13. The external end of piston rod 17 connects to a braking mechanism (not shown). Spring 19 surrounds piston rod 17 and forces this rod and piston 16 toward diaphragm 21 and housing part 12. Diaphragm 21 is cup shaped with a flanged portion 22 at its periphery. This flanged portion is clamped between flanges 23 of housing parts 12 and 13 to seal the spaces within housing parts 12 and 13 on opposite sides of the diaphragm.

In operation, compressed air enters space 20 beneath diaphragm 21 through ports (not shown). This compressed air causes diaphragm 21, piston 16 and piston rod 17 to move upwardly to actuate the braking mechanism. Diaphragm 21 moves to a position which is the inverse of that shown in FIG. 1 (the position assumed by the diaphragm when no force is applied). When the compressed air exits space 20, spring 19 returns diaphragm 21, piston 16 and piston rod 17 to the position shown in FIG. 1. Piston 29, piston rod 27 and spring 25 are part of an emergency braking system (in the event of the loss of air pressure) and a parking brake system.

Figure 2:
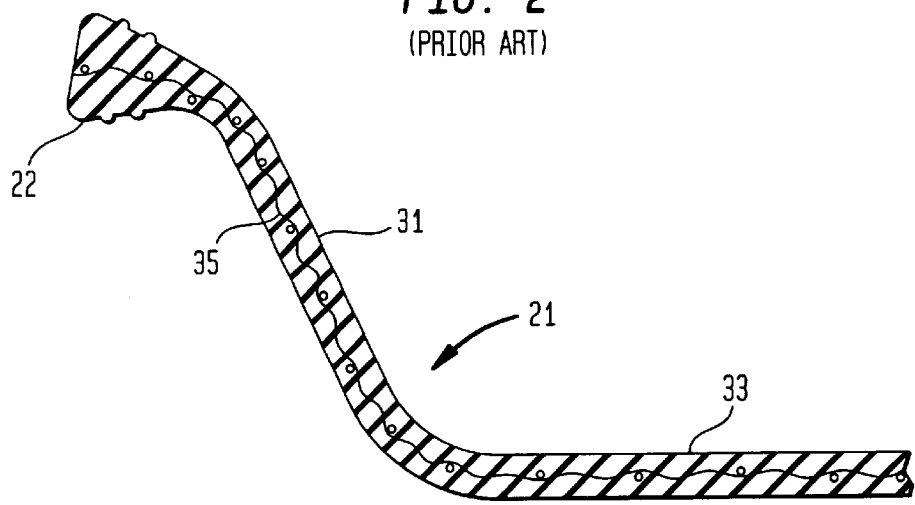
FIG. 2 is a partial, vertical sectional view of a prior art brake diaphragm for use in an air brake actuator such as that shown in FIG. 1.

An enlarged cross-sectional view of brake diaphragm 21 is shown in FIG. 2. Diaphragm 21 comprises a bottom planar wall 33 which engages piston 16. This bottom planar wall merges into annular sidewall 31 which connects flange 22 with bottom planar wall 33. Diaphragm 21 is made of two layers of a flexible material, such as rubber or synthetic rubber, with a layer of fabric 35 (e.g., nylon) sandwiched between these layers. Sidewall 31 and bottom wall 33 each have a thickness of approximately 0.13 inches.

Figure 3:
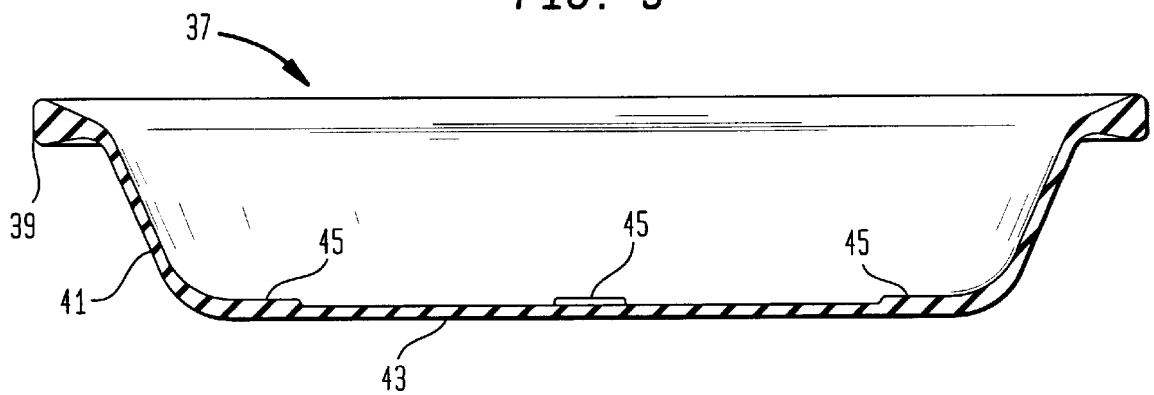
FIG. 3 is a vertical cross sectional, taken along line 3—3 of FIG. 5, of a thin-walled brake diaphragm in accordance with the present invention.
Figure 4:
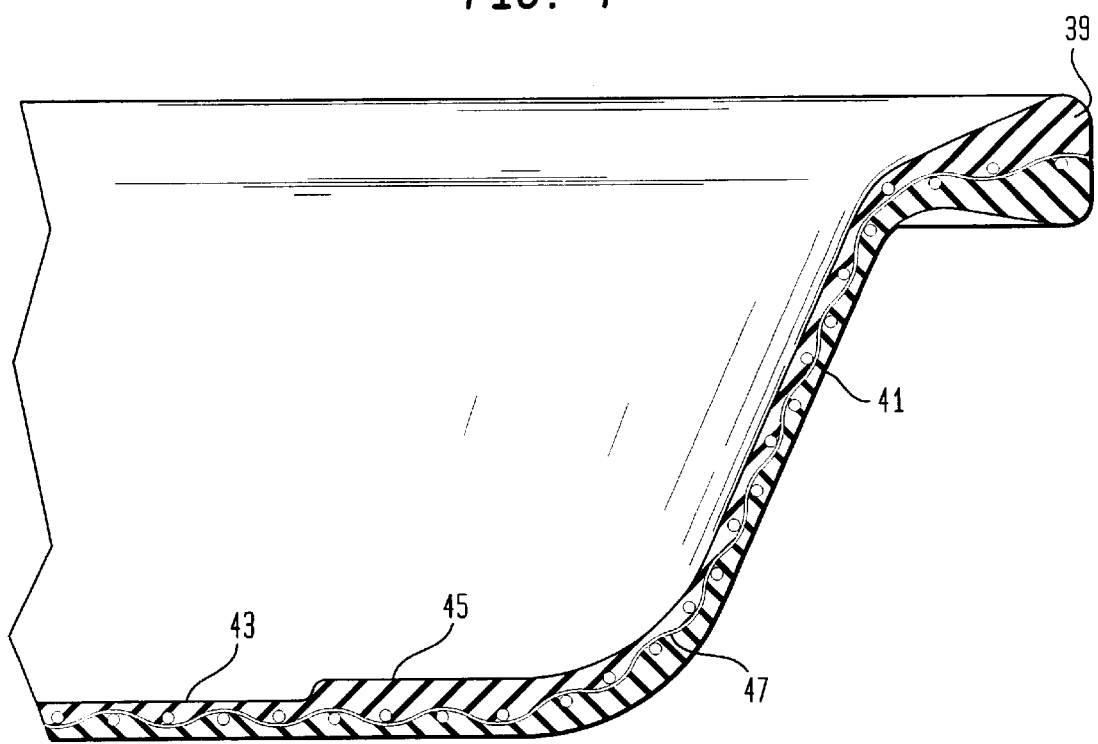
FIG. 4 is an enlarged sectional view of a portion of the brake diaphragm shown in FIG. 3.
Figure 5:
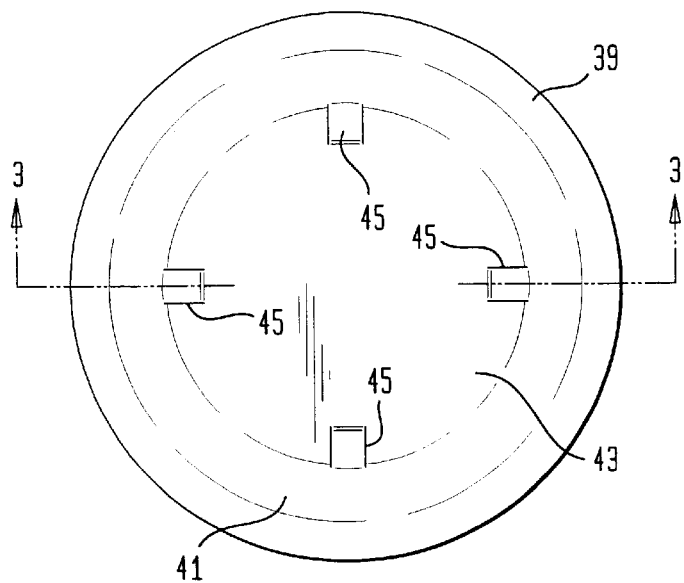
FIG. 5 is a plan view of a thin-walled brake diaphragm in accordance with the present invention.

A thin-walled brake diaphragm in accordance with the present invention is shown in FIGS. 3, 4 and 5. Like prior art diaphragm 21, brake diaphragm 37 is generally cup shaped and is made of two layers of rubber, or synthetic rubber, with a layer of fabric 47, such as nylon, sandwiched between these layers. An annular outer flange 39 surrounds the periphery of brake diaphragm 37. An annular sidewall 41 connects flange 39 to bottom planar wall 43.

Four evenly spaced planar tabs 45 are disposed on the interior surface of bottom wall 43. These tabs are rectangularly shaped and extend radially from the intersection of annular sidewall 41 and bottom wall 43 toward the center of the bottom wall. The tabs extend from this intersection for a distance equal to approximately one-third of the distance to the center of the bottom wall. The height of each of planar tabs 45 above the interior surface of bottom wall 43 is approximately 0.05 inches, and the width of each planar tab is approximately one half of the length of each tab.

The thickness of annular sidewall 41 is between approximately 0.06 inches and 0.10 inches, and the thickness of bottom wall 43, outside of the areas of the tabs, also is between approximately 0.06 inches and 0.10 inches. In a particularly preferred embodiment, the thickness of annular sidewall 41 is approximately 0.08 inches, and the thickness of bottom wall 43, outside of the areas of the tabs, also is approximately 0.08 inches.

As indicated above, the thickness of both the sidewall and bottom wall of prior art diaphragm 21 is approximately 0.13 inches. Except in the areas of the planar tabs, therefore, the thicknesses of the sidewall and the bottom wall of diaphragm 37 are between approximately fifty-four percent (54%) less and twenty-three percent (23%) less than the thicknesses of these walls on prior art diaphragm 21. For the particularly preferred embodiment whose sidewall and bottom wall each have a thicknesses of approximately 0.08 inches, these thicknesses are approximately thirty-eight percent (38%) less than the corresponding walls of prior art diaphragm 21. These decreases in thicknesses represent corresponding decreases in the amount of materials needed to manufacture diaphragm 37 and, therefore, in the cost of manufacturing this diaphragm.

Figure 6:
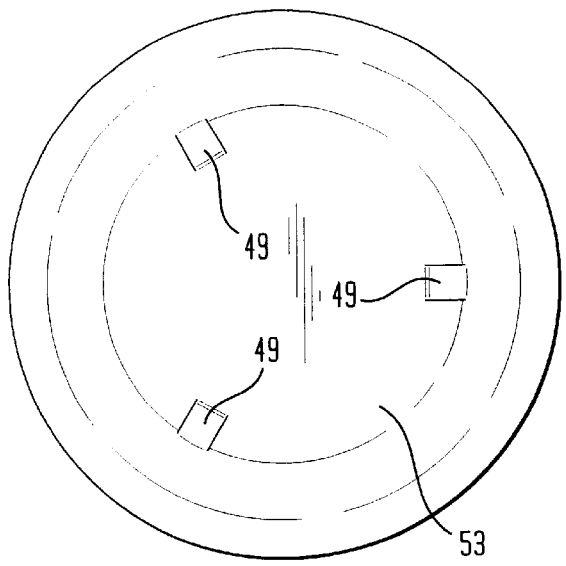
FIG. 6 is a plan view of a second embodiment of a thin-walled brake diaphragm in accordance with the present invention.
Figure 7:
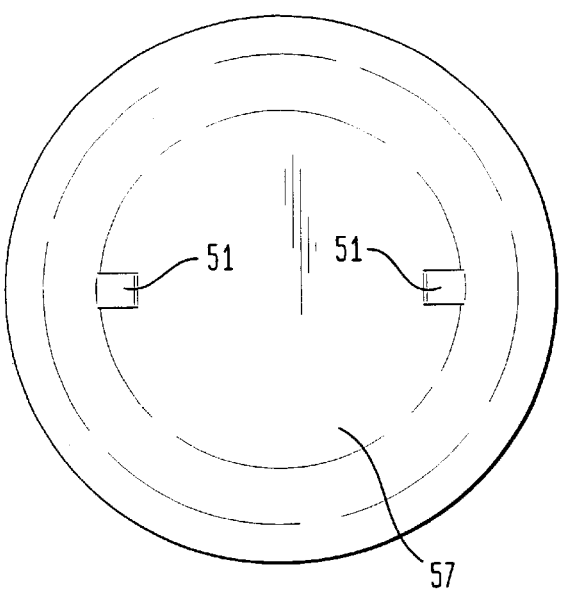
FIG. 7 is a plan view of a third embodiment of a thin-walled brake diaphragm in accordance with the present invention.

An alternative embodiment of a thin-walled brake diaphragm in accordance with the present invention is shown in FIG. 6. The structure and dimensions of the embodiment shown in FIG. 6 are essentially the same as those of the embodiment shown in FIGS. 3, 4 and 5, except that in the embodiment of FIG. 6, only three evenly spaced tabs 49 are disposed on the interior surface of the bottom planar wall 53. A further embodiment is shown in FIG. 7. The structure and dimensions of the embodiment of FIG. 7 also are essentially the same as those of the embodiment of FIGS. 3, 4 and 5, except that in the embodiment of FIG. 7, only two evenly spaced planar tabs 51 are disposed on the interior surface of the bottom planar wall 57. The position, size and shape of the tabs can be further modified within the scope of the invention. For example, the tabs can be in other shapes (e.g., triangles, squares or circles) and the spacing of the tabs could be irregular.

Prototypes of thin-walled brake diaphragms as shown in FIGS. 3, 4 and 5 were subjected to all of the testing criteria applicable to prior art diaphragm 21, including those of the Society of Automotive Engineers. Notwithstanding a substantial decrease in the thickness of the sidewall and bottom layer of diaphragm 37, and a substantial savings in materials and manufacturing costs, diaphragm 37 passed all of these tests.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A fabric reinforced, resilient brake diaphragm for use in a fluid pressure operated brake actuator, said actuator comprising a housing containing a piston and said diaphragm, said diaphragm comprising:

an annular outer flange for engaging said housing;

a bottom planar wall having an interior surface for engaging said piston;

an annular sidewall connecting said outer flange and said bottom planar wall; and a plurality of spaced planar tabs disposed on said interior surface, each of said planar tabs extending radially, from the intersection between said annular sidewall and said bottom planar wall, toward the center of said interior surface.

2. A brake diaphragm as in claim 1, wherein said planar tabs are evenly spaced on said interior surface along said intersection and are four in number.

3. A brake diaphragm as in claim 1, wherein said planar tabs are evenly spaced on said interior surface along said intersection and are three in number.

4. A brake diaphragm as in claim 1, wherein said planar tabs are evenly spaced on said interior surface along said intersection and are two in number.

5. A brake diaphragm as in claim 1, wherein each of said tabs is a rectangle extending radially for approximately one third of the distance from said intersection to the center of said interior surface.

6. A brake diaphragm as in claim 5, wherein the width of each rectangle is approximately one half of the length of each rectangle.

* * * * *